UNITED STATES PATENT OFFICE.

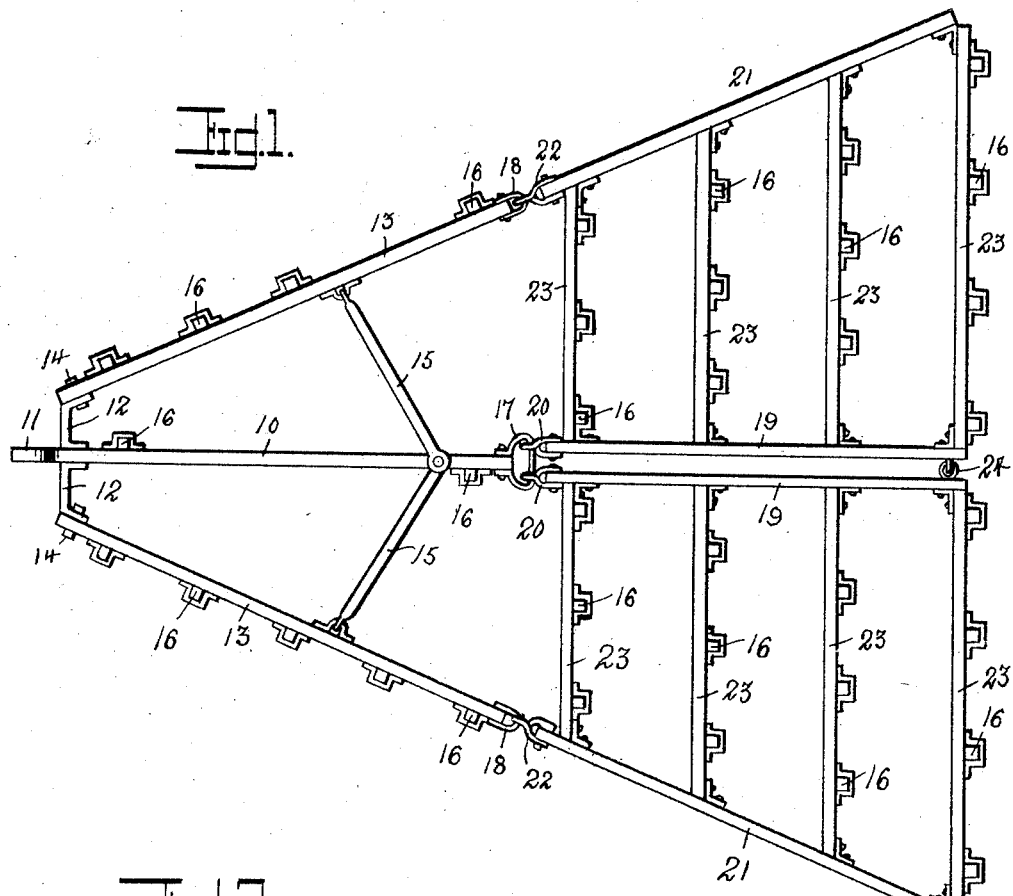
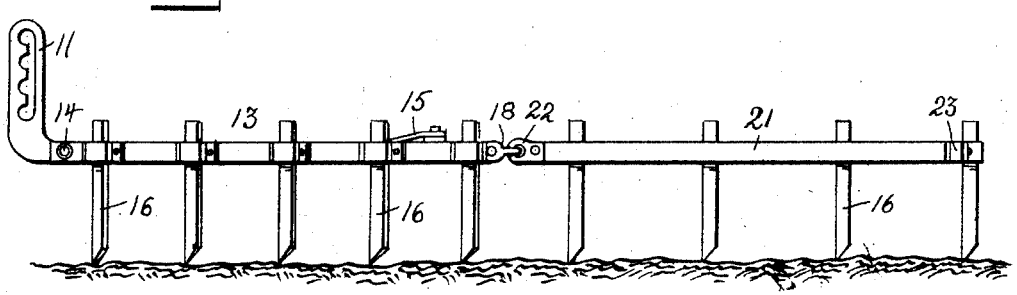

GEORGE W. FERRELL, OF APPLETON, TENNESSEE.

HARROW.

1,415,825.     Specification of Letters Patent.     Patented May 9, 1922.

Application filed August 3, 1920. Serial No. 400,958.

*To all whom it may concern:*

Be it known that I, GEORGE W. FERRELL, a citizen of the United States, residing at Appleton, in the county of Lawrence and State of Tennessee, have invented certain new and useful Improvements in a Harrow, of which the following is a specification.

This invention relates to harrows and has for one of its objects to improve the construction and increase the efficiency and utility of devices of this character.

With these and other objects in view, the invention consists in certain novel features of construction as hereinafter shown and described and then specifically pointed out in the claims, and in the drawings illustrative of the preferred embodiment of the invention.

Figure 1 is a plan view, and

Fig. 2 is a side elevation of the improved device.

The improved harrow comprises in general a forward section, substantially in A form, and coacting rear sections swingingly united and swingingly coupled to the forward section.

The forward section includes a central tooth bearing bar or "backbone" 10 upturned at the forward end, as shown at 11, with the upturned portion provided with a plurality of spaced apertures to receive the clevis to which the draft animals or tractor is coupled, the latter not being shown, as it forms no part of the present invention.

Attached to the backbone member 10 near its forward end, are laterally directed brackets 12 to whose outer ends side bars 13 are coupled as at 14.

The side bars 13 diverge toward the rear and are connected to the central bar 10 by braces 15.

A plurality of harrow teeth 16 are connected to the backbone member 10, one near each end, while like teeth are connected to the side bars 13, at spaced intervals. The teeth 16 are so arranged that they do not "trail" but each travels in its own path.

At its rear end the backbone member 10 is provided with a transversely elongated loop 17, while eye devices 18 are attached to the rear ends of the side bars 13.

The coacting rear sections are alike except that their outer sides diverge, or are disposed in alinement with the side bars 13. Each rear section includes an inner bar 19 swingingly coupled by a loop 20 to the elongated loop 17, outer bars 21 in longitudinal alinement with the side bars 13 of the forward section, and swingingly coupled to the eyes 18 of the same by loops 22.

The longitudinal bars 19 and oblique bars 21 are connected at spaced intervals by transverse bars 23.

The longitudinal bars 19 are swingingly coupled at the rear by loops 24, as shown.

A plurality of the teeth 16 are connected to the transverse bars 23, and so spaced that they do not "trail" each other, or the teeth of the forward section, but each makes its own track, thus forming " furrows" at substantially uniformly spaced distances.

By this arrangement a harrow is produced which is flexible or yieldable to cause it to readily adapt itself to the contour of the soil, so that the teeth engage the soil uniformly no matter how uneven it may be.

The improved device may be constructed in any suitable size and of any suitable material.

The preferred embodiment of the invention is disclosed in the drawings and set forth in the specification, but it will be understood that any modifications within the scope of the claims may be made in the construction without departing from the principle of the invention or sacrificing any of its advantages.

What is claimed is:

1. A harrow comprising a forward section having diverging side members, coacting rear sections having their confronting side members in parallel relation and the outer side members diverging rearwardly, means for flexibly coupling the coacting rear sections together, and means for flexibly coupling the rear sections to the forward sections with the diverging sides of the rear sections in alinement with the diverging sides of the forward section.

2. A harrow comprising a forward section including a central longitudinal beam and rearwardly diverging side beams, a laterally elongated loop carried by the central beam, coacting rear sections having their confronting side members in parallel relation and the outer side members diverging rearwardly, an eye carried by each of the confronting side members of the rear sections and engaging the central loop of the forward section, and means for flexibly coupling the diverging members of the rear sections to the diverging members of the forward section.

3. In a harrow, the combination of a forward section having diverging side members, coacting rear sections each having confronting side members in parallel relation and outer diverging side members in longitudinal alinement with the diverging members of the forward section, means for flexibly coupling said rear sections together, and means for flexibly coupling the rear sections to the forward section.

In testimony whereof, I affix my signature hereto.

GEO. W. FERRELL.